United States Patent
Jiang et al.

(10) Patent No.: US 10,268,413 B2
(45) Date of Patent: Apr. 23, 2019

(54) OVERFLOW REGION MEMORY MANAGEMENT

(71) Applicant: Samsung Electronics Co., Ltd., Suwon-si, Gyeonggi-do (KR)

(72) Inventors: Dongyan Jiang, San Jose, CA (US); Changhui Lin, San Jose, CA (US); Krishna Malladi, San Jose, CA (US); Jongmin Gim, Milpitas, CA (US); Hongzhong Zheng, Los Gatos, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/473,311

(22) Filed: Mar. 29, 2017

(65) Prior Publication Data

US 2018/0217777 A1    Aug. 2, 2018

Related U.S. Application Data

(60) Provisional application No. 62/451,157, filed on Jan. 27, 2017.

(51) Int. Cl.
    *G06F 12/00*    (2006.01)
    *G06F 3/06*    (2006.01)
    (Continued)

(52) U.S. Cl.
    CPC .......... *G06F 3/0644* (2013.01); *G06F 3/0604* (2013.01); *G06F 3/0619* (2013.01);
    (Continued)

(58) Field of Classification Search
    None
    See application file for complete search history.

(56) References Cited

U.S. PATENT DOCUMENTS

| 6,438,560 B1 | 8/2002 | Loen |
| 7,650,460 B2 | 1/2010 | Cheriton |
(Continued)

OTHER PUBLICATIONS

John Peter Stevenson, "Fine-Grain In-Memory Deduplication for Large-Scale Workloads," a dissertation submitted tot eh Department of Electrical Engineering and the Committee on Graduate Studies of Stanford University, Dec. 2013, 140 pages.
(Continued)

*Primary Examiner* — John A Lane
(74) *Attorney, Agent, or Firm* — Innovation Counsel, LLP

(57) ABSTRACT

A memory module includes a host interface configured to provide an interface to a host computer; one or more memory devices; a deduplication engine configured to provide a virtual memory capacity of the memory module that is larger than a physical size of the one or more memory devices; a memory controller for controlling access to the one or more memory devices; a volatile memory comprising a hash table, an overflow memory region, and a credit unit, wherein the overflow memory region stores user data when a hash collision occurs or the hash table is full, and wherein the credit unit stores an address of an invalidated entry in the overflow memory region; and a control logic is configured to control the overflow memory region and the credit unit and generate a warning indicating a status of the overflow memory region and the credit unit.

20 Claims, 6 Drawing Sheets

(51) Int. Cl.
  *G06F 12/10* (2016.01)
  *G06F 13/16* (2006.01)
  *G06F 13/42* (2006.01)

(52) U.S. Cl.
  CPC .......... *G06F 3/0641* (2013.01); *G06F 3/0656* (2013.01); *G06F 3/0665* (2013.01); *G06F 3/0683* (2013.01); *G06F 12/10* (2013.01); *G06F 13/1673* (2013.01); *G06F 13/4282* (2013.01); *G06F 2212/65* (2013.01); *G06F 2213/0026* (2013.01); *G06F 2213/16* (2013.01)

(56) References Cited

U.S. PATENT DOCUMENTS

| | | | |
|---|---|---|---|
| 8,065,476 B2 | 11/2011 | Cheriton | |
| 8,230,168 B2 | 7/2012 | Cheriton | |
| 8,504,791 B2 | 8/2013 | Cheriton | |
| 8,612,673 B2 | 12/2013 | Cheriton | |
| 8,938,580 B2 | 1/2015 | Cheriton | |
| 9,251,087 B2 | 2/2016 | Nellans et al. | |
| 9,501,421 B1 | 11/2016 | Cheriton | |
| 9,513,824 B2 | 12/2016 | Suzuki et al. | |
| 9,520,193 B2 | 12/2016 | Cheriton | |
| 2011/0320684 A1* | 12/2011 | Gorobets | G06F 12/0246 711/103 |
| 2012/0221776 A1* | 8/2012 | Yoshihashi | G06F 12/0804 711/103 |
| 2013/0275699 A1 | 10/2013 | Cheriton | |
| 2013/0290636 A1 | 10/2013 | Chen et al. | |
| 2015/0074339 A1 | 3/2015 | Cheriton | |
| 2016/0291891 A1 | 10/2016 | Cheriton | |
| 2017/0109049 A1 | 4/2017 | Cheriton | |

OTHER PUBLICATIONS

Heiner Litz, et al., "Fine-Grain Memory Deduplication for In-Memory Database Systems," 22 pages.

Yoongu Kim, "HICAMP: Architectural Support for Efficient Concurrency-Safe Shared Structured Data Access," Cheriton et al., ASPLOS 2012, Nov. 18, 2013, 43 pages.

David Cheriton, et al., "HICAMP: Architectural Support for Efficient Concurrency-Safe Shared Structured Data Access," Hicamp Systems, Inc., pp. 287-299.

* cited by examiner

OVERFLOW REGION MEMORY MANAGEMENT

CROSS-REFERENCE TO RELATED APPLICATION(S)

This application claims the benefits of and priority to U.S. Provisional Patent Application Ser. No. 62/451,157 filed Jan. 27, 2017, the disclosure of which is incorporated herein by reference in its entirety.

TECHNICAL FIELD

The present disclosure relates generally to deduplicated memory systems, more particularly, to a system and method for managing an overflow memory region in a deduplicated memory module.

BACKGROUND

Memory devices having high capacity and low latency are highly demanded for data center applications. Such memory device may employ a deduplication scheme as well as a data compaction scheme to provide a larger memory capacity than their physical memory size. Deduplicated memory devices can consistently achieve a high deduplication ratio by reducing the duplicated user data and fully utilizing the available memory resources. In addition, the deduplication scheme employed by the deduplicated memory devices can achieve efficient addressing to the deduplicated data.

When employing a deduplication scheme, issues such as hash collision and end-of-memory capacity may arise that require proper handling in both the memory hardware and the software for controlling the memory device. For example, when a user data cannot be fit into a bucket of the hash table, the user data is placed in an overflow region of the deduplicated memory device. When a host computer writes the new user data to a location that is pointed to an entry in the overflow memory region of the deduplicated memory device, the overflow memory region will have an invalid entry because the new user data is written to the hash table. In this case, the new user data is written into the deduplicated memory region or a new overflow memory region. As a result, the overflow region can contain an invalided entry that is commonly referred to as a memory hole.

SUMMARY

According to one embodiment, a memory module includes a host interface configured to provide an interface to a host computer; one or more memory devices; a deduplication engine configured to provide a virtual memory capacity of the memory module that is larger than a physical size of the one or more memory devices; a memory controller for controlling access to the one or more memory devices; a volatile memory comprising a hash table, an overflow memory region, and a credit unit, wherein the overflow memory region stores user data when a hash collision occurs or the hash table is full, and wherein the credit unit stores an address of an invalidated entry in the overflow memory region; and a control logic is configured to control the overflow memory region and the credit unit and generate a warning indicating a status of the overflow memory region and the credit unit.

According to another embodiment, a method includes: implementing a control logic in a deduplication memory module, wherein the deduplication memory module comprises one or more memory devices; storing hash values of user data in a hash table of the deduplication memory module including entries of physical lines (PLs) that is identifiable by a physical line ID (PLID) stored in an address translation table by using a hash function; providing a virtual memory capacity of the deduplication memory module that is larger than a physical size of the one or more memory devices; storing user data in an overflow memory region when a hash collision occurs or the hash table is full; storing one or more credits in a credit unit, wherein each of the one or more credits corresponds to an address of one or more invalidated entries in the overflow memory region; and generating a warning indicating a status of the overflow memory region and the credit unit.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
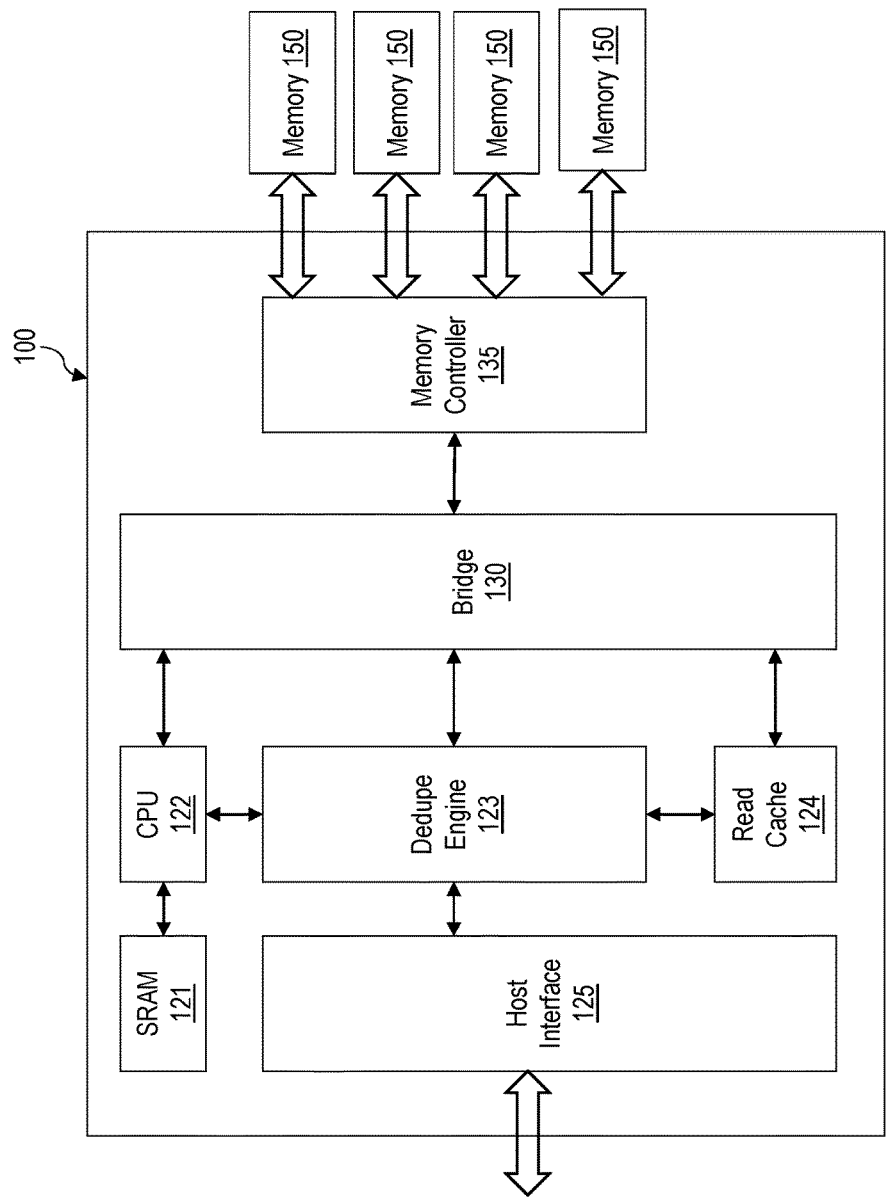
FIG. 1 illustrates a block diagram of an example deduplication memory module, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for managing an overflow memory region in a deduplicated memory module. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a system and method for managing an overflow memory region of a deduplicated memory module and handling cases of hash collision and end-of-memory capacity in a hash table. The deduplicated memory module can include a deduplication engine that can provide a larger memory capacity than its physical memory size. While employing a deduplication scheme in a deduplicated memory module, issues such as hash collision and end of memory capacity can arise. The present disclosure further provides a hash collision handling mechanism and a hardware controller logic that can provide a host computer with status and conditions of the overflow memory region of the deduplicated memory module. A memory management unit, referred herein to as a credit unit, is used to handle invalid entries in the overflow memory region of the deduplicated memory module by storing the invalid memory entry addresses into a circular buffer.

FIG. 1 illustrates a block diagram of an example deduplication memory module, according to one embodiment. The deduplication memory module 100 includes a static memory SRAM 121, a CPU 122, a deduplication engine 123, a read cache 124, a host interface 125, a bridge 130 (e.g., an AXI X-bar, a bridge IP, a customized direct attach logic), and a memory controller 135 that interfaces with one or more memory devices 150 (e.g., DRAMs, flash memories). The deduplication memory module 100 can provide a larger memory capacity than a physical memory size for the coupled memory devices 150.

The deduplication memory module 100 is coupled to a host computer (not shown) over the host interface 125. For example, the deduplication memory module 100 has an asynchronous memory interface. The deduplication memory module 100 can have a form factor of a double data rate (DDR) memory module and can be coupled to the host computer over the asynchronous memory interface. It is noted that any other non-memory interfaces such as the peripheral component interconnect express (PCIe) interface, the non-volatile memory express (NVMe), and the NVM over fabrics (NVMeoF) may be used to provide an interface between the deduplication memory module 100 and the host computer. In one embodiment, the deduplication memory module 100 may be a non-volatile dual in-line memory module NVDIMM (e.g., NVDIMM-P, a type of NVDIMM configured as a persistent storage) including one or more non-volatile memory devices (e.g., flash memory) or at least one non-volatile memory device and one or more volatile memory devices (e.g., dynamic random-access memory (DRAM)).

The SRAM 121 can store various parameters that are specific to the deduplication memory module 100 including, but not limited to, a deduplication algorithm an application history, and a selection policy. The CPU 122 can apply different deduplication algorithms stored in the SRAM 121 based on a user selection. The deduplication algorithm can be upgraded and saved to the SRAM 121 via the host interface 125.

The read cache 124 represents a cached version of a deduplicated memory of the deduplicated memory module 100. The read cache 124 can explicitly cache entries of an address translation table, metadata entries (e.g., signature/reference counts) entries, etc. The read cache 124 can reduce the number of memory accesses to the memory devices 150.

According to one embodiment, the host computer can have an access to the deduplication memory module 100 over the host interface 125 (e.g., DDRT, NVDIMM-P, PCIe). The deduplication engine 123 can provide larger memory capacity (i.e., the virtual memory capacity) of the deduplication memory module 100 to the host computer. Due to the deduplicated data stored in the memory devices 150 of the deduplication memory module 100, the virtual memory capacity of the deduplication memory module 100 can be larger than its physical memory capacity.

Figure 2A:
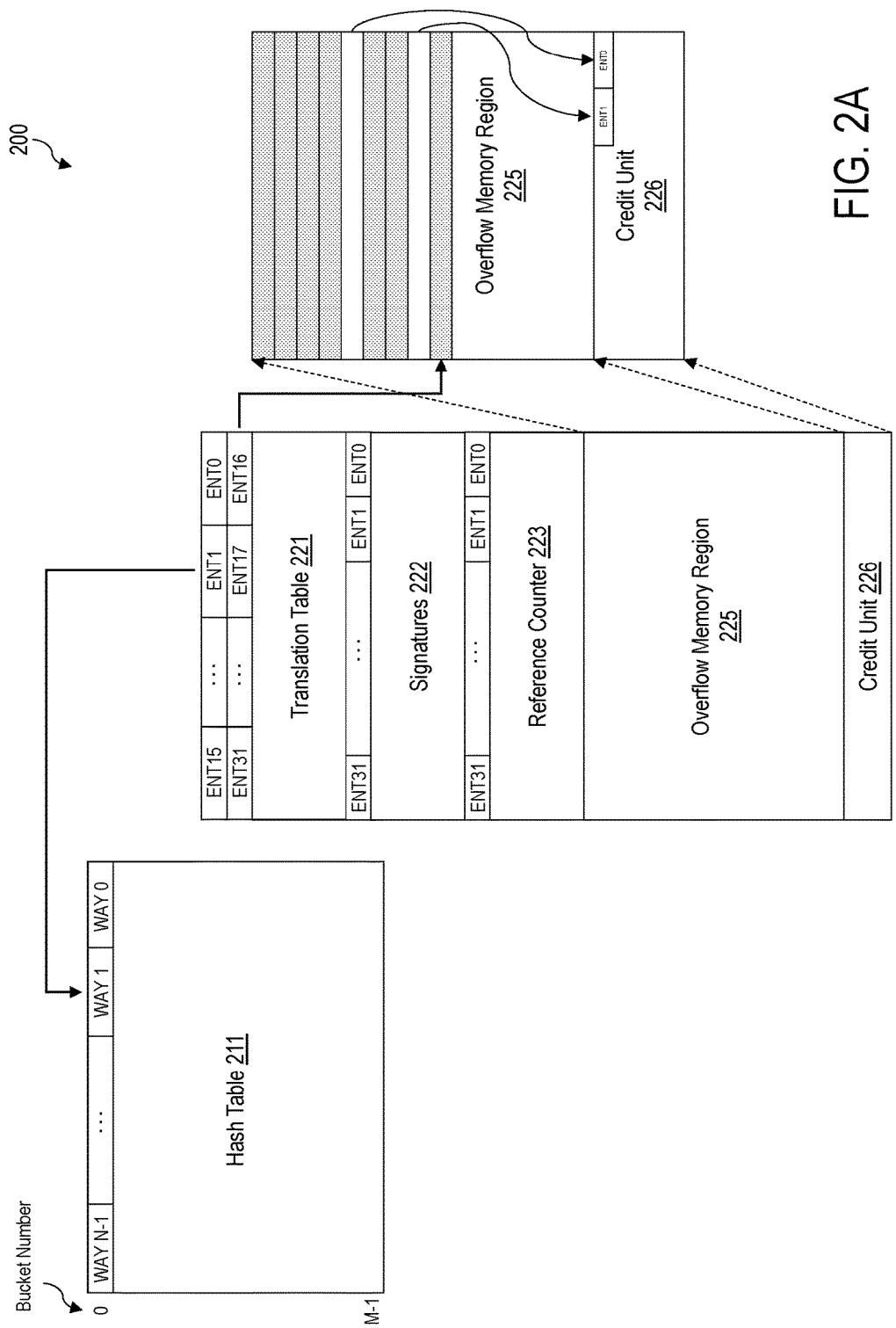
FIG. 2A illustrates an architecture of an example deduplication memory module, according to one embodiment.
Figure 2B:
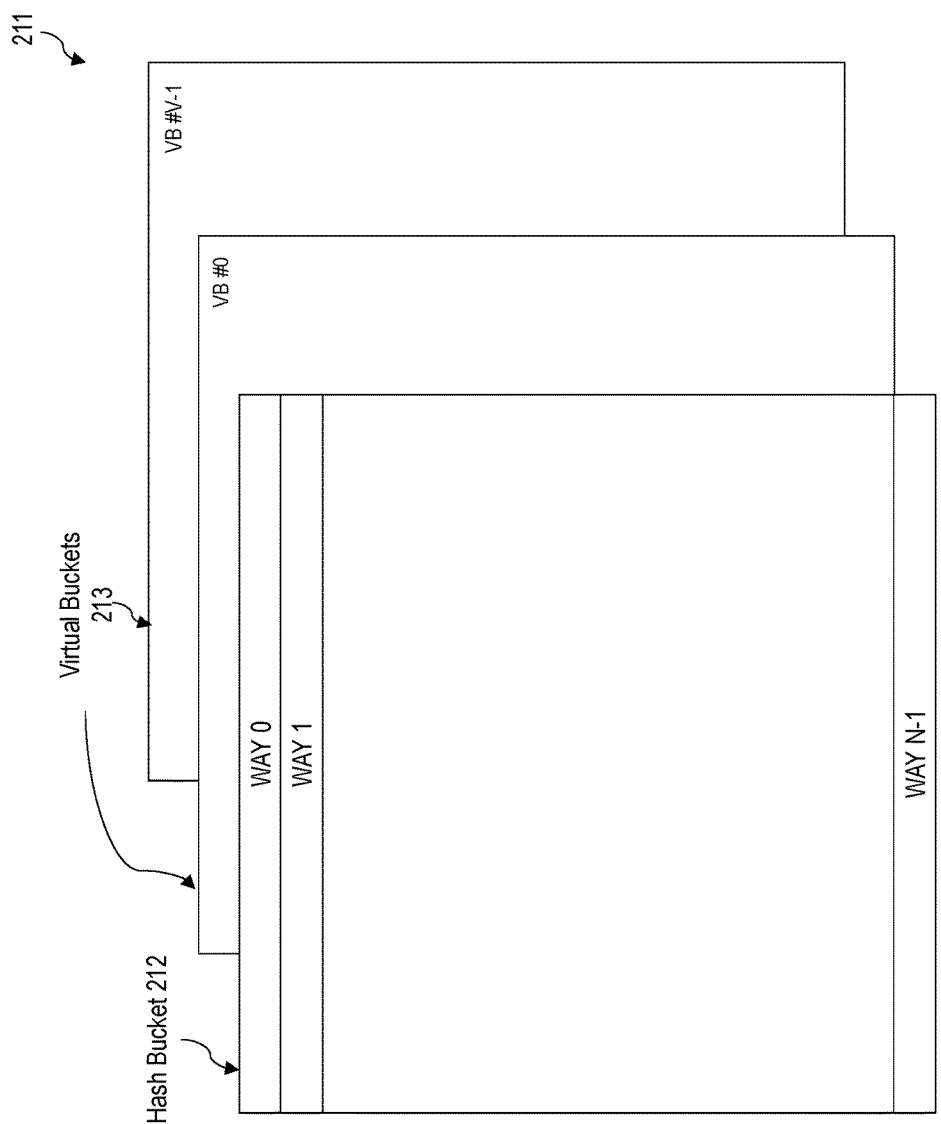
FIG. 2B illustrates an example hash table, according to one embodiment.

FIG. 2A illustrates an architecture of an example deduplication memory module, according to one embodiment. The deduplication memory module 200 can include a volatile memory (e.g., DRAM) for storing various tables including a hash table 211, an address translation table 221, a signature table 222, and a reference counter table 223, an overflow memory region 225, and a credit unit 226. FIG. 2B illustrates an example hash table, according to one embodiment.

The hash table 211 can store deduplicated user data C with a fixed width that is herein referred to as a physical line (PL). For example, a physical line (PL) length is 64-byte. The PL length is configurable with other sizes, for example, 32-byte or smaller.

According to one embodiment, the hash table 211 is organized by one or more hash buckets. A hash bucket 212 includes multiple entries (ways or columns) that are the container of the user data, herein referred to as a physical line (PL). Each hash bucket 212 may be associated with one or more virtual buckets (VBs) 213 to extend the size of the hash bucket 212. In the present example, the hash bucket 212 can include v virtual buckets 213. Each hash bucket 212 can have a specified virtual bucket height, herein referred to as a VB height h. The virtual buckets 213 allow user data placement in a near-by-location hash bucket 212, for example, within the specified VB height h. When searching a PL, the search logic can search the hash bucket 212 and its associated virtual buckets 213.

The address translation table 221 can store information to translate a logical address (LA) to a physical address (PA) of user data C. An identifier for a PL herein referred to as a PLID is used for translation of the logical address to the physical address of the user data C. A physical line ID (PLID) may include a hash bucket number concatenated with a column number. While the hash bucket number may be generated by using a hash function h1(C). For example, the hash function h1(C) can produce a (log M)-bit hash value to index a PLID to a corresponding hash bucket 212, where M is the total numbers of the hash buckets. The deduplication engine (e.g., deduplication engine 123 of FIG. 1) may find an empty column (or way) in the hash bucket. The physical line ID (PLID) corresponds to the concatenation of the hash bucket number and the column number.

For each physical line, a corresponding signature value stored in the signature table 222. The signature is a smaller hash value of the user data C that is generated by a second hash function h2(C). A reference counter is also associated with a particular physical line. A reference counter indicates the number of times that the user data C matching the content of the physical line. For example, a reference counter may represent a deduplication ratio of a specific user data.

The logical address (LA) is an address received by the deduplication engine (e.g., deduplication engine 123 of FIG. 1) from a host computer. The physical address (PA) is an address that points to entries in the hash table 211, the signature table 222, the reference counter table 223, and the credit unit 224.

When the user data C cannot be fit into the hash bucket 212 nor virtual buckets 213 of the hash table 211, the user data C is put into the overflow memory region 225. For example, the host computer may generate the same hash value for two or more different user data C. In this case, it is considered that a hash collision occurred, and the user data C is put into the overflow memory region 225. In another example, the user data C is put into the overflow memory region 225 when the hash buckets 212 are full and its associated virtual buckets 213 are also full so that no more user data C can be placed in the hash table 211.

According to one embodiment, the credit unit 226 is used to recycle invalidated entries in the overflow memory region 225. The recycled entries in the overflow memory region 225 by the credit unit 226 can avoid memory holes that may occur in the overflow memory region 225 if invalidation of entries in the overflow memory region is not handled properly. Details of the overflow memory region 225 and the credit unit 226 will be discussed below with respect to FIG. 3 through FIG. 5.

Figure 3:
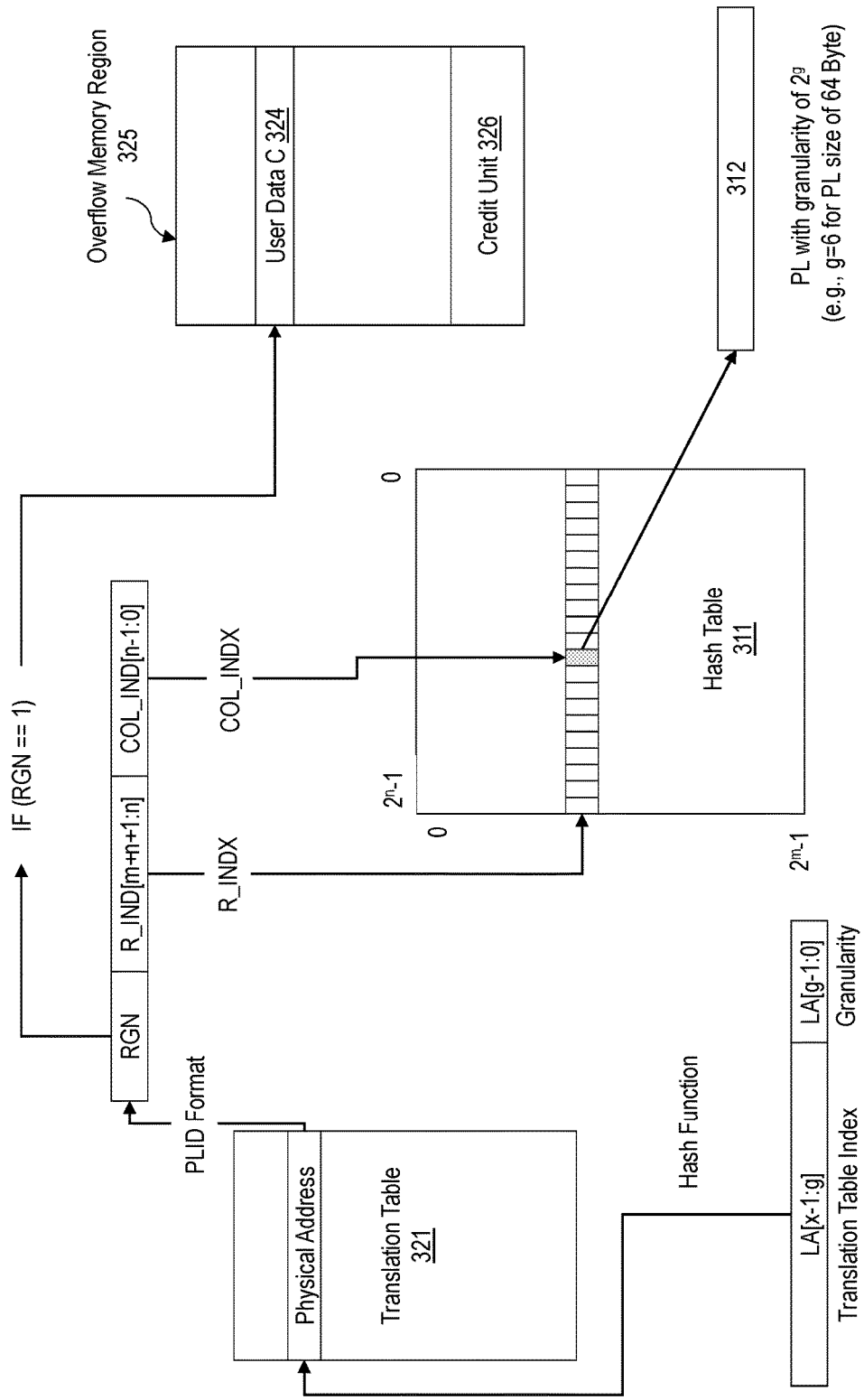
FIG. 3 illustrates an example process of a user data placed in an overflow memory region of a deduplicated memory module, according to one embodiment.

FIG. 3 illustrates an example process of a user data placed in an overflow memory region of a deduplicated memory module, according to one embodiment. A logical address of a user data C may be an x-bit address including granularity of g bits and a translation table index of (x-g) bits. The granularity bits can determine a size of the PL. For example, for the 6-bit granularity (g=6), the size of the PL is 64 Byte ($2^6$). The translation table index of the logical address may be translated into a corresponding physical address using a hash function h1. The physical address obtained by the hash function h1 is looked up in the translation table 321 and further formatted to identify a condition for writing to the overflow memory region 325 (e.g., RGN bit) and indices to index to the hash table 311. The indices to the hash table 311 include a row index R_INDX (herein also referred to as a hash bucket number) and a column index COL_INDX (herein also referred to as a way number) indexing to an entry within the hash bucket 312. A one-bit indicator RGN in the formatted physical address indicates that a hash collision has occurred, or the hash table 311 is full, and the user data has been written into overflow region. When RGN bit is equal to "1", the deduplication engine places the user data 324 in the overflow memory region 325. Otherwise, the deduplication engine places the user data 324 in one of the hash buckets 312 as identified by the row and column indices R_INDX and COL_INDX.

When the host computer invalidates an entry in the overflow memory region 325 and writes the new user data to the hash table 311, or a new entry in the overflow memory region 325, the overflow memory region 325 can have a memory hole that corresponds to the invalidated entry. According to one embodiment, a credit unit 326 is used to recycle the invalidated entries in the overflow memory region 325. The recycled entries in the overflow memory region 325 by the credit unit 326 can be reused to avoid any memory hole in the overflow memory region 325.

According to one embodiment, a memory space for the credit unit 326 is reserved within the overflow memory region 325. The deduplication engine of the deduplicated memory module can have a reserved memory space for the overflow memory region. According to another embodiment, a dedicated memory region for the credit unit 326 can be reserved in another region of a faster memory (e.g., SRAM) separately from the overflow memory region 325 for better performance.

Figure 4:
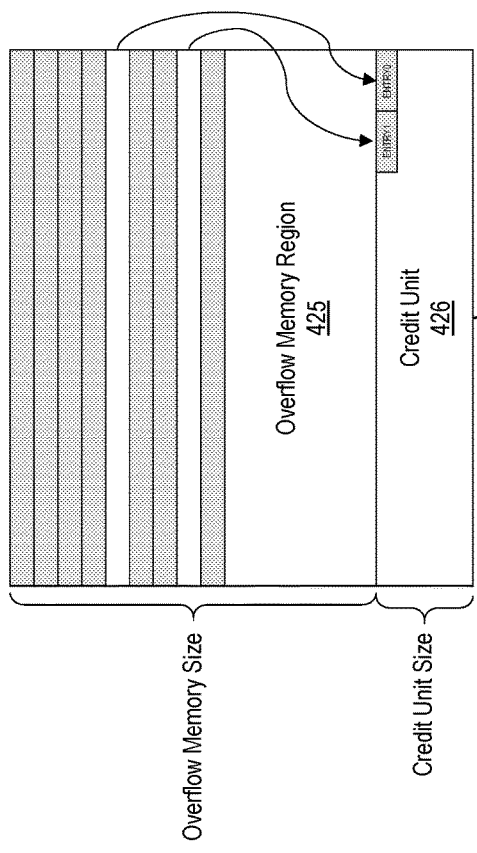
FIG. 4 illustrates an example credit unit for managing the overflow memory region, according to one embodiment.
Figure 4:
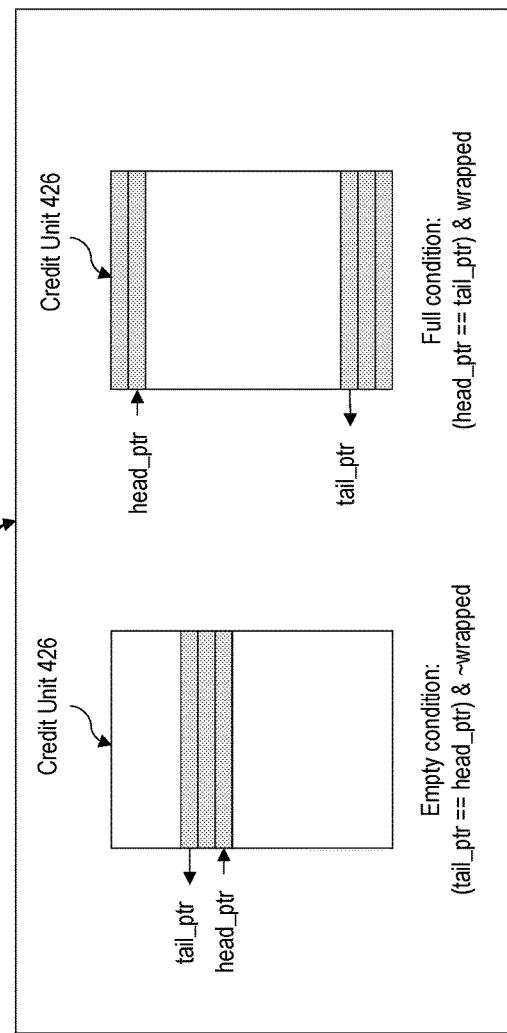

FIG. 4 illustrates an example credit unit for managing the overflow memory region, according to one embodiment. When the host computer invalidates an entry in the overflow memory region 425, the corresponding address in the overflow memory region 425 is saved in the credit unit 426 as a credit. When the deduplicated memory subsequently writes to the overflow memory region 425, the entry in the overflow memory region 425 as indicated by the address identified by the credit can be reused by the write operation without creating a memory hole in the overflow memory region 425.

According to one embodiment, the credit unit 426 has a size that is proportional to the size of the overflow memory region 425 to guarantee that invalid entries can be recycled by the credit unit 426. For example, the maximum memory size of credit unit equals to (overflow_memory_size*(credit_entry_size/pl_entry_size)). For example, each entry in the overflow memory region 425 is 512-bit (or 64-byte, this is the PL size) wide, and the pointer of the overflow memory region 425 is 32-bit. In this case, if the size of the overflow memory region 425 is 1024 MB with an entry size of 64-bytes, and the credit unit 426 is sized to be 64 MB with an entry size of 32-bit. This is the maximum size of the credit unit 426 to be able cover an extreme case where all the entries in the overflow memory region are invalided at the same time. Combining with the credit unit utilization monitoring, the size of the credit unit can be sized to be smaller than the maximum size to save the memory space (e.g., DRAM) of the deduplicated memory module.

According to one embodiment, the credit unit 426 is implemented as a circular buffer. As an entry in the overflow memory region 425 is invalidated, the corresponding address of the invalidated entry of the overflow memory region 425 is stored in the credit unit as a credit. The circular buffer can have a head pointer (head_ptr) and a tail pointer (tail_ptr). The head pointer indicates the head of the credit unit entries, and the tail pointer indicates the tail of the current credit unit entries. The head pointer and tail pointer can point to an entry in the credit unit 426. Based on application, the credit unit could also be implemented as a last-in-first-out queue.

According to one embodiment, the deduplication memory has a control logic for managing the overflow memory region 425 and the credit unit 426. When the head pointer is positioned below the tail pointer within the credit unit 426, the control logic sets a bit referred to as wrapped to indicate that the entries in the credit unit 426 are wrapped around. The control logic can indicate that the credit unit 426 is empty when the head pointer equals to the tail pointer, and the wrapped bit is false. The control logic can indicate that the credit unit 426 is full when the head pointer equals to the tail pointer, but the wrapped bit is true.

The control logic can handle a condition of the overflow memory region's end-of-capacity as an exception event from a software side and/or a hardware side. According to one embodiment, a deduplicated memory has one or more dedicated registers (e.g., a status register, an interrupt register) to indicate various warning and exception conditions.

According to one embodiment, the control logic of the deduplicated memory module generates a status indicator of the overflow memory region 425. The overflow memory region status indicator can indicate various status of the overflow memory region 425 including, but not limited to, an almost-full warning, a full warning, an overrun error condition. When requested by the host computer, the deduplication memory module can provide the overflow memory region status indicator indicating the current condition of the overflow memory region 425. For example, in an overflow memory region overrun case, the deduplicated memory module halts the requested memory write operation setting an overflow memory full error (e.g., 513 in FIG. 5). If the deduplication engine of the deduplicated memory module reads a failure address or a wrong address, the deduplication engine can return "0" to the host computer.

According to one embodiment, the control logic of the deduplicated memory module generates an indicator indicating a condition of the credit unit 426. The credit unit condition indicator can indicate various status of the credit unit 426 including, but not limited to, a full warning and an empty warning. The control logic can issue an empty warning when the head pointer of the credit unit 426 approaches to the tail pointer with the wrapped bit being false. The control logic can issue a full warning when the head pointer approaches to the tail pointer with the wrapped bit being true.

Figure 5:
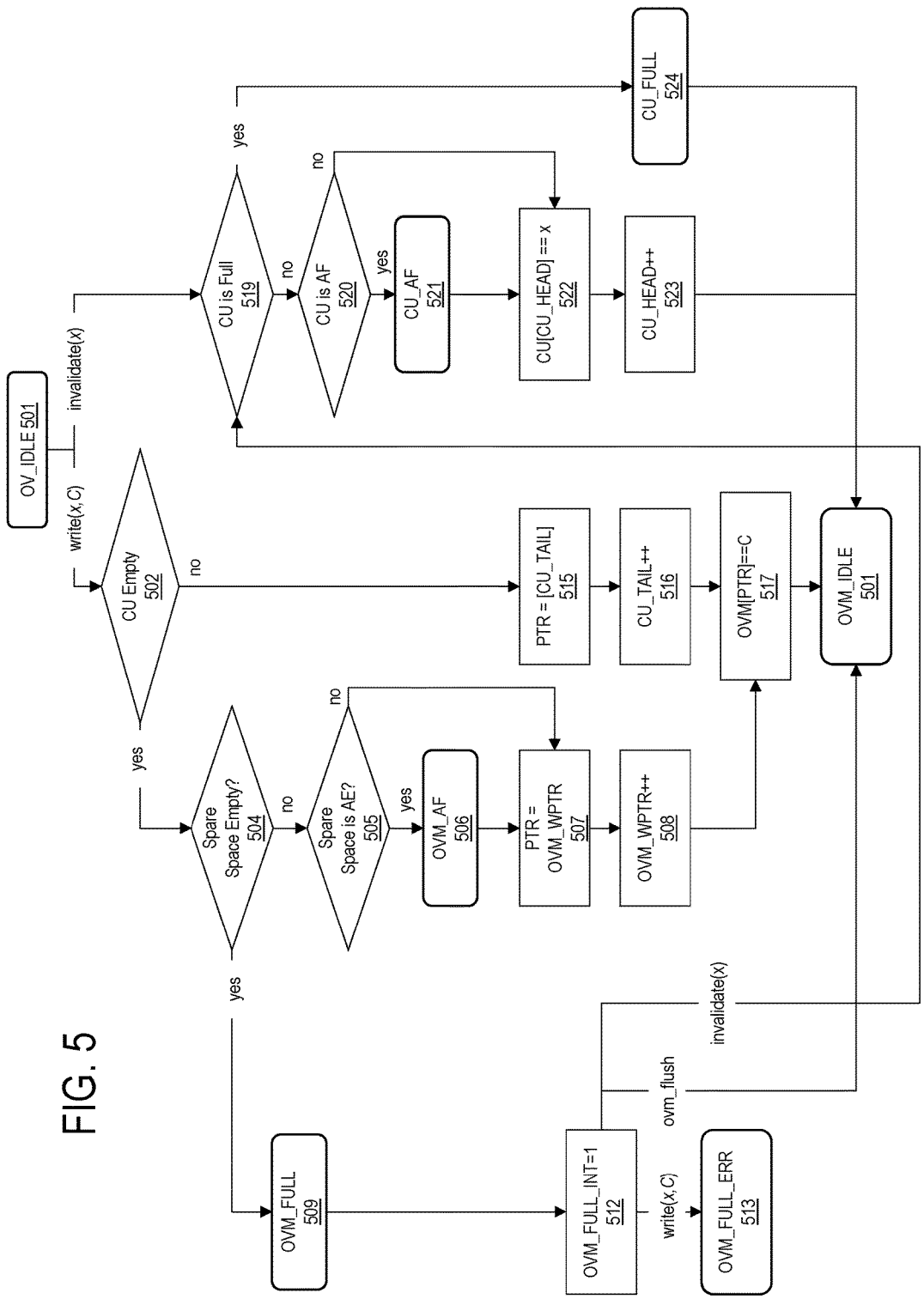
FIG. 5 is a flowchart of an example control logic, according to one embodiment.

FIG. 5 is a flowchart of an example control logic of a deduplicated memory module, according to one embodiment. The control logic that handles the operation of an overflow memory region or a credit unit idles (501) until the deduplication engine issues a command to instruct the control logic to write a user data to an overflow memory region or invalidate an entry in the overflow memory region, or flush the overflow memory region. When a memory write request write(x, C) including a memory location x in the overflow memory region and a user data C is arrived from a host computer, the control logic first checks if the credit unit is empty (502). If the credit unit is not empty, the tail pointer of the credit unit is set to be the pointer PTR (515), and the tail pointer is incremented (516). The entry in the overflow memory region that corresponds to the pointer PTR is set to include the user data C (517), and the control logic returns to an idle state (501).

If the credit unit is empty in step 502, the control logic checks if a spare space in the overflow memory region is empty (504). If the space spare is empty, the control logic issues a warning that the overflow memory region is full (509). The control logic further checks if the credit unit is bypassed (510). If the space spare is not empty in the overflow memory region in step 504, the control logic checks if the spare space is almost empty (AE) (505). If the spare space is almost empty in step 505, the control logic issues a warning indicating that the overflow memory region is almost full (OVM_AF)) is set (506). After checking whether the spare space is almost full, the control logic sets the pointer PTR to be the write pointer in the overflow memory region (507), and the overflow write pointer is incremented (508). The entry in the overflow memory region that corresponds to the pointer PTR is set to include the user data C (517), and the control logic returns to an idle state (501).

After the control logic issues a warning that the overflow memory region is full in step 509, the control logic sets an interrupt OVM_FULL_INT to one (512) to instruct to the host computer that the overflow memory region is full. The control logic may issue a warning message via the host interface instead of setting the OVM_FULL_INT interrupt. The control logic writes the user data C in the location x in the overflow memory region (i.e., write (x,C)) and issues an overflow memory full error (513). After the OVM_FULL_INT is set to one in step 512, the control logic further performs the next step depending on the command received from the deduplication engine. For example, the command is a write command (write(x,C)), a flush command to flush the overflow memory region, and an invalidate(x) command.

When the host computer instructs to invalidate an entry x in the overflow memory region, the control logic checks if the credit unit is full (519). If the credit unit is full, the control logic sets the credit unit indicator to be full (524), and the control logic returns to an idle state (501). If the credit unit is not full but is almost full (520), the control logic issues a warning indicating that the credit unit is almost full (521). The entry in the credit unit that corresponds to the head pointer is set to be the memory location x in the overflow memory region (522), the head pointer of the credit unit is incremented (523), and the control logic returns to an idle state (501).

According to one embodiment, a memory module includes a host interface configured to provide an interface to a host computer; one or more memory devices; a deduplication engine configured to provide a virtual memory capacity of the memory module that is larger than a physical size of the one or more memory devices; a memory controller for controlling access to the one or more memory devices; a volatile memory comprising a hash table, an overflow memory region, and a credit unit, wherein the overflow memory region stores user data when a hash collision occurs or the hash table is full, and wherein the credit unit stores an address of an invalidated entry in the overflow memory region; and a control logic is configured to control the overflow memory region and the credit unit and generate a warning indicating a status of the overflow memory region and the credit unit.

The host interface may be a double data rate (DDR) interface.

The host interface may be a peripheral component interconnect express (PCIe) interface.

A memory space for the credit unit may be reserved within the overflow memory region.

A memory space for the credit unit may be reserved in an SDRAM that is separate from the overflow memory region.

A size of the credit unit may be set to be proportional to a size of the overflow memory region.

The warning indicating the status of the overflow memory region and the credit unit may be generated using one or more registers.

The credit unit may be implemented as a circular buffer including a head pointer and a tail pointer, or a last-in-first-out queue.

The control logic may be configured to generate a status indicator of the overflow memory region including an almost-full warning, a full warning, an overrun error condition.

The control logic may be configured to generate a credit unit condition indicator indicating a condition of the credit unit including a full warning and an empty warning.

According to another embodiment, a method includes: implementing a control logic in a deduplication memory module, wherein the deduplication memory module comprises one or more memory devices; storing hash values of user data in a hash table of the deduplication memory module including entries of physical lines (PLs) that is identifiable by a physical line ID (PLID) stored in an address translation table by using a hash function; providing a virtual memory capacity of the deduplication memory module that is larger than a physical size of the one or more memory devices; storing user data in an overflow memory region when a hash collision occurs or the hash table is full; storing one or more credits in a credit unit, wherein each of the one or more credits corresponds to an address of one or more invalidated entries in the overflow memory region; and generating a warning indicating a status of the overflow memory region and the credit unit.

The method may further include providing a host interface between the deduplication memory module and a host computer.

The host interface may be a double data rate (DDR) interface or a peripheral component interconnect express (PCIe) interface.

A memory space for the credit unit may be reserved within the overflow memory region.

A memory space for the credit unit may be reserved in an SDRAM that is separate from the overflow memory region.

A size of the credit unit may be set to be proportional to a size of the overflow memory region.

The warning indicating the status of the overflow memory region and the credit unit may be generated using one or more registers.

The credit unit may be implemented as a circular buffer including a head pointer and a tail pointer, or a last-in-first-out queue.

The method may further include generating a status indicator of the overflow memory region including an almost-full warning, a full warning, an overrun error condition.

The method may further include generating a credit unit condition indicator indicating a condition of the credit unit including a full warning and an empty warning.

The above example embodiments have been described hereinabove to illustrate various embodiments of implementing a system and method for providing a system and method for managing an overflow memory region in a deduplicated memory module. Various modifications and departures from the disclosed example embodiments will occur to those having ordinary skill in the art. The subject matter that is intended to be within the scope of the invention is set forth in the following claims.

What is claimed is:

1. A memory module comprising:
a host interface configured to provide an interface to a host computer;
one or more memory devices;
a deduplication engine configured to provide a virtual memory capacity of the memory module that is larger than a physical size of the one or more memory devices;
a memory controller for controlling access to the one or more memory devices;
a volatile memory comprising a hash table, an overflow memory region, and a credit unit, wherein the overflow memory region stores user data when a hash collision occurs or the hash table is full, and wherein the credit unit stores an address of an invalidated entry in the overflow memory region; and
a control logic is configured to control the overflow memory region and the credit unit and generate a warning indicating a status of the overflow memory region and the credit unit.

2. The memory module of claim 1, wherein the host interface is a double data rate (DDR) interface.

3. The memory module of claim 1, wherein the host interface is a peripheral component interconnect express (PCIe) interface.

4. The memory module of claim 1, wherein a memory space for the credit unit is reserved within the overflow memory region.

5. The memory module of claim 4, wherein a memory space for the credit unit is reserved in an SDRAM that is separate from the overflow memory region.

6. The memory module of claim 4, wherein a size of the credit unit is set to be proportional to a size of the overflow memory region.

7. The memory module of claim 4, wherein the warning indicating the status of the overflow memory region and the credit unit is generated using one or more registers.

8. The memory module of claim 1, wherein the credit unit is implemented as a circular buffer including a head pointer and a tail pointer, or a last-in-first-out queue.

9. The memory module of claim 8, wherein the control logic is configured to generate a status indicator of the overflow memory region including an almost-full warning, a full warning, an overrun error condition.

10. The memory module of claim 8, wherein the control logic is configured to generate a credit unit condition indicator indicating a condition of the credit unit including a full warning and an empty warning.

11. A method comprising:
implementing a control logic in a deduplication memory module, wherein the deduplication memory module comprises one or more memory devices;
storing hash values of user data in a hash table of the deduplication memory module including entries of physical lines (PLs) that is identifiable by a physical line ID (PLID) stored in an address translation table by using a hash function;
providing a virtual memory capacity of the deduplication memory module that is larger than a physical size of the one or more memory devices;
storing user data in an overflow memory region when a hash collision occurs or the hash table is full;
storing one or more credits in a credit unit, wherein each of the one or more credits corresponds to an address of one or more invalidated entries in the overflow memory region; and
generating a warning indicating a status of the overflow memory region and the credit unit.

12. The method of claim 11, further comprising providing a host interface between the deduplication memory module and a host computer.

13. The method of claim 12, wherein the host interface is a double data rate (DDR) interface or a peripheral component interconnect express (PCIe) interface.

14. The method of claim 11, wherein a memory space for the credit unit is reserved within the overflow memory region.

15. The method of claim 14, wherein a memory space for the credit unit is reserved in an SDRAM that is separate from the overflow memory region.

16. The method of claim 14, wherein a size of the credit unit is set to be proportional to a size of the overflow memory region.

17. The method of claim 14, wherein the warning indicating the status of the overflow memory region and the credit unit is generated using one or more registers.

18. The method of claim 11, wherein the credit unit is implemented as a circular buffer including a head pointer and a tail pointer, or a last-in-first-out queue.

19. The method of claim 18, further comprising generating a status indicator of the overflow memory region including an almost-full warning, a full warning, an overrun error condition.

20. The method of claim 18, further comprising generating a credit unit condition indicator indicating a condition of the credit unit including a full warning and an empty warning.

* * * * *